3,816,625
METHOD FOR LOWERING URIC ACID LEVELS USING 7 - ALKYL-SULFONYL SUBSTITUTED BENZOTHIADIAZINE-1,1-DIOXIDES
Frederick C. Novello, Berwyn, Pa., assignor to Merck & Co., Inc., Rahway, N.J.
No Drawing. Filed June 22, 1972, Ser. No. 265,132
Int. Cl. A61k 27/00
U.S. Cl. 424—246                    7 Claims

ABSTRACT OF THE DISCLOSURE

Method for decreasing the concentration of uric acid in the blood and urine of a mammal by the administration of a 7-alkyl(or aralkyl)sulfonyl-1,2,4-benzothiadiazine-1,1-dioxide product. The products employed in this method of treatment are prepared by conventional methods such as oxidizing a 7-alkyl- or aralkylthio substituent to the 7-alkyl- or aralkylsulfonyl group or cyclizing a 4-alkyl- or aralkylthio-orthanilamide by known methods followed by oxidation of the 7-thio to the 7-sulfonyl moiety. The products effect the lowering of the uric acid level by virtue of their xanthine oxidase inhibiting properties.

---

This invention is concerned with a method of lowering the uric acid level in the blood and urine of a mammal by the administration of a benzothiadiazine compound having a 7-alkylsulfonyl- or a 7-aralkylsulfonyl substituent, which products have been found to exhibit xanthine oxidase inhibiting properties, many comparable to or greater than that exhibited by allopurinol when all compounds are evaluated in the same in vitro test.

The products employed in the method of this invention have the structural formula

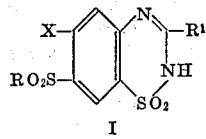

I and pharmocologically acceptable salts thereof wherein X represents halo (preferably chloro), $C_{1-3}$-alkyl (particularly methyl) and trifluoromethyl; R represents a straight or branched chain lower alkyl having fom 1 to 6 carbon atoms and phenyl-lower alkyl having from 1 to 3 carbon atoms (preferably benzyl); $R^1$ represents (1) hydrogen, (2) lower alkyl having from 1 to 5 carbon atoms or substituted lower alkyl wherein the substituent is mono, di- or trihalo (preferably chloro), and phenyl, (3) the group —$CO_2R^2$ wherein $R^2$ is hydrogen or lower alkyl having from 1 to 5 carbon atoms, (4) the group —$CONH_2$ or (5) an azine optionally substituted with one or more lower alkyl having 1 to 3 carbon atoms or a diazine optionally substituted with one or more lower alkyl having from 1 to 3 carbon atoms.

The active products can be prepared by one or another of the well known procedures for making benzothiadiazine compounds of structure I, advantageously as illustrated below

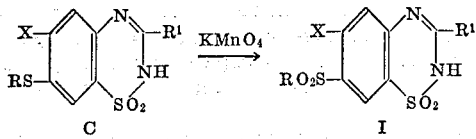

The 7-R-thio substituent in compound C can be oxidized by any conventional method, suitably by treatment with potassium permanganate, as illustrated above, or with other oxidizing substances such as a peroxide, as hydrogen peroxide. The reaction advantageously is carried out in the presence of an organic solvent such as acetic acid, acetone and the like, and with slight warming suitably between about ambient temperature to about 50° C.

Pharmacologically acceptable salts of these products generally are the alkali metal salts which can be prepared by conventional methods, for example by treatment with an alkali metal hydroxide, e.g. sodium or potassium hydroxide, in a solvent such as a lower alkanol or in water and evaporating the solvent or by reacting the free compound, for example, in an ether, e.g. p-dioxane or diethyleneglycol dimethyl ether solution with an alkali metal hydride or amide and removing the solvent. Mono- or poly-salts may be obtained.

Starting substance, C, is prepared by one of the following procedures:

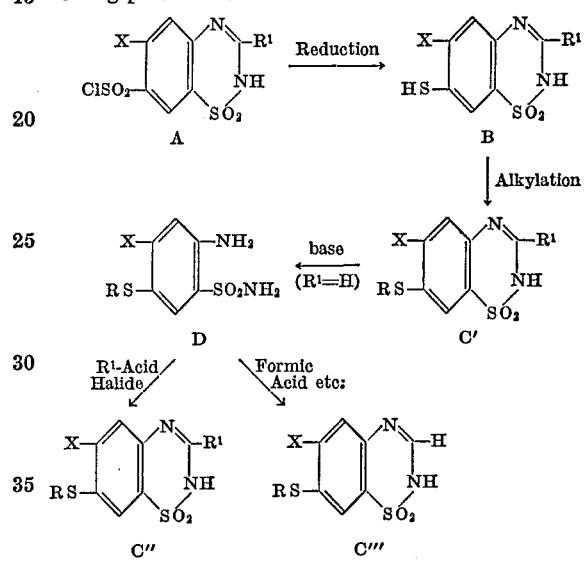

Preparation of compound C initially involves the reduction of the 7-chloro sulfonyl substituent of the benzothiadiazine, A. Reduction advantageously is effected with slight warming of compound A with a mixture of stannous chloride and hydrochloric acid, zinc amalgam and sulfuric acid, zinc dust and sulfuric acid or tin and hydrochloric acid. Alkylation of the 7-mercapto product thus obtained, B, provides product C′, which can be employed as starting substance in preparing the active agents employed in the method of this invention.

The orthanilamide, D, can sometimes be used more advantageously to prepare starting substances for the compounds of this invention which are either unsubstituted in the 3-position or where certain specific substituents are desired in this position. This substance can be made by moderate heating of C′ ($R^1$=H) in the presence of base.

The appropriate orthanilamide derivative, D, can be reacted with an acid halide which, for practical purposes can be the acid chloride, followed by treatment with an organic base to provide product C″ wherein $R^1$ is other than hydrogen or a haloalkyl substituent. When $R^1$ is hydrogen, the orthanilamide, D, is cyclized by heating with formic acid or an alkyl orthoformate. When $R^1$ is a haloalkyl group the orthanilamide is reacted with an haloalkanoic acid halide, followed by treatment with a salt of a weak acid and strong base, suitably sodium or potassium acetate or potassium fluoride.

When an organic base is employed following the reaction of the orthanilamide and acid chloride the base of choice is ammonia or a tertiary amine particularly tertiary lower alkylamines. Employment of a tertiary amine in alcoholic solution provides the 3-carboxylic acid

3 ester derivative. The 3-carbamoyl substituent is prepared employing ammonia following reaction of the orthanilamide with an alkoxalyl halide. Ammonia employed following reaction with a mono-carboxylic acid halide provides product where $R^1$ is alkyl, phenalkyl, an azine or diazine substituent. The nature of the alkyl and halo substituents in the alkoxalyl halide is not critical and can be any lower alkyl or halide and suitably, for practical purposes, ethyl oxalyl chloride can be employed.

The $R^1$-acid chloride can be performed and employed in the reaction or it can be prepared *in situ* by the addition of phosphorus oxychloride to a mixture of the orthanilamide and the $R^1$-carboxylic acid. When the acid chloride is preformed, the reaction advantageously is conducted in the presence of an inert solvent such as dioxane, tetrahydrofuran, benzene, toluene, and the like and is facilitated by heating up to the reflux temperature of the reaction mixture. When the acid chloride is formed *in situ*, the phosphorus oxychloride serves not only to form the acid chloride but as solvent as well.

As the active agents, I, of the method of this invention are inhibitors of xanthine oxidase, they effectively decrease the concentration of uric acid in the blood and urine of mammals, and additionally increase the excretion of hypoxanthine and xanthine. The method of this invention therefore is particularly useful in the treatment and management of gout preferably by oral administration of from about 100 to 800 mg. per day of the active products in divided doses as prescribed by the physician.

Especially effective xanthine oxidase inhibitors useful in the method of this invention are products I having a 6-chloro, a 7-lower-alkylsulfonyl substituent and attached to the 3-position 4-pyridyl, methyl, a $-CO_2$Alkyl or $-CONH_2$.

Any of the known methods for formulating thiazide products can be used in the preparation of suitable dosage forms of the active agents employed in the method of this invention. The following formulation is illustrative of one suitable dosage form:

Compressed tablet containing 0.5 g. of active ingredient

|  | Grams |
|---|---|
| 3-(4-pyridyl)-6-chloro-7-isopropylsulfonyl-1,2,4-benzothiadiazine-1,1-dioxide | 500.0 |
| Starch paste, 12.5%, 100 cc., allow | 12.5 |
|  | 512.5 |
| Starch, U.S.P. corn | 25.0 |
| Magnesium stearate | 5.5 |
|  | 543.0 |

The thiazide is granulated with the starch paste and while moist passed through a No. 14 screen, dried at 45° C. for 20 hours and then passed 3 times through a No. 14 screen. The starch is passed through a No. 90 bolting cloth onto the granulation and all ingredients are blended thoroughly. The magnesium stearate then is passed through a No. 90 bolting cloth onto the granulation and all ingredients are blended after which the granulation is compressed into tablets using 14/32 in. flat, bevelled, scored punch having a thickness of 0.205±0.005 in. yielding 1,000 tablets, each weighing 0.543 gram.

The following methods were employed to prepare the products of Structure I.

EXAMPLE 1

6-chloro-7-isopropylsulfonyl-1,2,4-benzothiadiazine-1,1-dioxide

Step A: Preparation of 6-chloro-7-mercapto-1,2,4-benzothiadiazine-1,1-dioxide.—A solution of stannous chloride dihydrate (180.5 g., 0.80 mole) in concentrated hydrochloric acid (160 ml.) is added to a stirred solution of 6-chloro-7-chlorosulfonyl-1,2,4-benzothiadiazine-1,1-dioxide (50.4 g., 0.16 mole) at 75° C. and maintained at this temperature for an additional 20–30 minutes. The solution is concentrated in vacuo to one-tenth its original volume and poured into 8 liters of ice water containing concentrated hydrochloric acid (200 ml.). The solid formed is collected and added with stirring to one liter of saturated sodium bicarbonate solution. After one hour, the solution is filtered and the filtrate acidified with hydrochloric acid, the product collected on a filter, washed with water and recrystallized from ethanol providing product melting at 270–272° C.

Analysis calculated for $C_7H_5ClN_2O_2S_2$: C, 33.80; H, 2.03; N, 11.26. Found: C, 34.24; H, 2.14; N, 11.26.

By replacing the stannous chloride and concentrated hydrochloric acid employed in the above example by zinc amalgam and sulfuric acid, zinc dust and sulfuric acid, or tin and concentrated hydrochloric acid the same product is obtained.

Step B.—Preparation of 6-chloro-7-isopropylthio-1,2,4-benzothiadiazine-1,1-dioxide.—A suspension of 6-chloro-7-mercapto-1,2,4-benzothiadiazine - 1,1 - dioxide (49.7 g., 0.02 mole), prepared as described in Step A, in dimethylformamide (300 ml.) is heated with anhydrous potassium carbonate (27.6 g., 0.02 mole) with stirring. A solution results within 30 minutes whereupon isopropyl chloride (0.022 mole) is added with stirring over a 30-minute period. The reaction mixture is heated on a steam bath for one hour, poured onto a mixture of ice (2 liters) and water (2 liters) and acidified with concentrated hydrochloric acid. The solid is collected, stirred with 5% sodium hydroxide solution (1500 ml.) at room temperature and filtered. The filtrate is acidified with concentrated hydrochloric acid and the product collected and recrystallized from a mixture of methanol and water to provide 6-chloro-7 - isopropylthio - 1,2,4 - benzothiadiazine - 1,1-dioxide, M.P. 231–232° C.

Analysis calculated for $C_{10}H_{11}ClN_2O_2S_2$: C, 41.30; H, 3.81; N, 9.64. Found: C, 41.48; H, 3.88; N, 9.65.

Step C: Preparation of 6-chloro-7-isopropylsulfonyl-1,2,4-benzothiadiazine-1,1-dioxide. A solution of potassium permanganate (0.003 mole) in water (10 ml.) is added dropwise to a solution of 6-chloro-7-isopropylthio-1,2,4-benzothiadiazine-1,1-dioxide (0.002 mole) in acetic acid (30 ml.) and water (10 ml.). The mixture is stirred at 30° C. for one hour, treated with sodium bisulfite and diluted with water. The product, following recrystallization from acetone, melts at 280–282° C.

Analysis calculated for $C_{10}H_{11}ClN_2O_4S_2$: C, 37.21; H, 3.44; N, 8.86. Found: C, 37.37; H, 3.14; N, 8.73.

Following the procedure of Example 1, Step B, but replacing the isopropyl chloride by an equivalent quantity of benzyl chloride, n-propyl chloride and 1-ethylpropyl chloride, respectively, followed by oxidation by the process described in Step C of Example 1, there is obtained, sequentially:

EXAMPLE 2

Step B Process 6-chloro-7-benzylthio - 1,2,4 - benzothiadiazine - 1,1-dioxide, M.P. 268–271° C.

Analysis calculated for $C_{14}H_{11}ClN_2O_2S_2$: C, 49.62; H, 3.27; N, 8.27. Found: C, 50.14; H, 3.43; N, 8.24.

Step C process 6-chloro-7-benzylsulfonyl - 1,2,4 - benzothiadiazine-1,1-dioxide, M.P. 287–290° C.

Analysis calculated for $C_{14}H_{11}ClN_2O_4S_2$: C, 45.34; H, 2.99; N, 7.56. Found: C, 45.25; H, 3.07; N, 7.53.

EXAMPLE 3

Step B process 6-chloro-7-n-propylthio-1,2,4-benzothiadiazine-1,1-dioxide, M.P. 193–194° C.

Analysis calculated for $C_{10}H_{11}ClN_2O_2S_2$: C, 41.30; H, 3.81; N, 9.64. Found: C, 41.55; H, 3.87; N, 9.72.

Step C process 6-chloro-7-n-propylsulfonyl-1,2,4-benzothiadiazine-1,1-dioxide, M.P. 246–248° C.

Analysis calculated for $C_{10}H_{11}ClN_2O_4H_2$: C, 37.21; H, 3.44; N, 8.68. Found: C, 37.35; H, 3.40; N, 8.67.

EXAMPLE 4

Step B process 6-chloro-7-(1-ethylpropylthio)-1,2,4-benzothiadiazine-1,1-dioxide, M.P. 208–209° C.

Analysis calculated for $C_{12}H_{15}ClN_2O_2S_2$: C, 45.20; H, 4.74; N, 8.79. Found: C, 45.32; H, 4.54; N, 8.83.

Step C process 6-chloro-7-(1-ethylpropylsulfonyl)-1,2,4-benzothiadiazine-1,1-dioxide, M.P. 263–265° C.

Analysis calculated for $C_{12}H_{15}ClN_2O_4S_2$: C, 41.08; H, 4.31; N, 7.99. Found: C, 40.96; H, 4.38; N, 7.98.

EXAMPLE 5

6-trifluoromethyl-7-isopropylsulfonyl-1,2,4-benzothiadiazine-1,1-dioxide

Step A: Preparation of 6-trifluoromethyl-7-chlorosulfonyl-1,2,4-benzothiadiazine-1,1-dioxide. 6-trifluoromethyl-7-sulfamoyl-1,2,4-benzothiadiazine-1,1-dioxide (0.2 mole) is added portionwise with stirring to chlorosulfonic acid (300 ml.) cooled in an ice-bath over 30 minutes. The mixture is then heated for two hours on the steam bath, cooled and poured onto a mixture of ice and water. The solid product is collected on the filter, washed with cold water and air-dried at room temperature and recrystallized from acetone-hexane.

Step B: Preparation of 6-trifluoromethyl-7-isopropylsulfonyl-1,2,4-benzothiadiazine-1,1-dioxide. 6-trifluoromethyl-7-mercapto-1,2,4-benzothiadiazine-1,1-dioxide is prepared by reducing 6-trifluoromethyl-7-chlorosulfonyl-1,2,4-benzothiadiazine-1,1-dioxide with stannous chloride dihydrate by substantially the same procedure described in Example 1, Step A, employing equivalent quantities of all reactants and reagents. Alkylation of this product by reaction with isopropyl chloride as described in Example 1, Step B, to give the 7-isopropylthio derivative followed by oxidation with potassium permanganate by the procedure of Step C of Example 1 provides 6-trifluoromethyl-7-isopropylsulfonyl-1,2,4-benzothiadiazine-1,1-dioxide.

EXAMPLE 6

6-methyl-7-isopropylsulfonyl-1,2,4-benzothiadiazine-1,1-dioxide

By replacing the 6-trifluoromethyl-7-sulfamoyl-1,2,4-benzothiadiazine-1,1-dioxide employed in Step A of Example 5 by an equivalent quantity of 6-methyl-7-sulfamoyl-1,2,4-benzothiadiazine-1,1-dioxide and then followed substantially the same procedure described in Steps A and B of Example 5, there is obtained 6-methyl-7-isopropylsulfonyl-1,2,4-benzothiadiazine-1,1-dioxide.

The products identified in Table I are prepared by the process of Example 1 employing equivalent quantities of the 7-mercapto-benzothiadiazine, B, an alkylating agent, R-chloride (R being the radical identified in the table) in the process of Step B followed by oxidation as described in Step C:

TABLE I

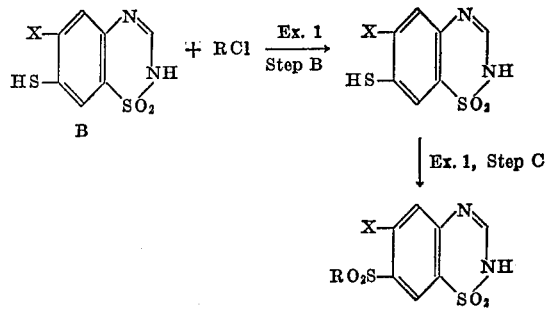

| Ex. No. | X | R |
|---|---|---|
| 7 | $CF_3$ | $CH_3(CH_2)_2$— |
| 8 | $CH_3$ | $CH_3(CH_2)_2$— |
| 9 | $CH_3$ | $(C_2H_5)_2$—CH— |

EXAMPLE 10

3-(4-pyridyl)-6-chloro-7-isopropylsulfonyl-1,2,4-benzothiadiazine-1,1-dioxide

Step A: Preparation of 2-sulfamoyl-4-isopropylthio-5-chloroaniline. 6-chloro-7-isopropylthio-1,2,4-benzothiadiazine-1,1-dioxide (0.03 mole), prepared as described in Example 1, Step B, is dissolved in 10% aqueous sodium hydroxide (50 ml.) and heated on the steam bath for one hour. The solution is chilled, acidified with hydrochloric acid and the product upon recrystallization from a mixture of ethanol and water melts at 137–138° C.

Analysis calculated for $C_9H_{13}ClN_2O_2S_2$: C, 38.50; H, 4.66; N, 9.98. Found: C, 38.71; H, 4.60; N, 9.81.

Step B: Preparation of 3-(4-pyridyl)-6-chloro-7-isopropylthio-1,2,4-benzothiadiazine-1,1-dioxide. An intimate mixture of the orthanilamide derivative prepared as described in Step A (0.01 mole) and 4-pyridine carboxylic acid (0.01 mole) is heated with 20 ml. of phosphorus oxychloride for 15 minutes at 50° C. and 45 minutes on the steam bath. The solution is cooled, poured onto ice and the product heated on the steam bath with ethanol (50 ml.) and concentrated ammonium hydroxide (50 ml.) for two hours. After concentration in vacuo, the residue is treated with 50 ml. of water acidified with hydrochloric acid yielding 3-(4-pyridyl)-6-chloro-7-isopropylthio-1,2,4-benzothiadiazine-1,1-dioxide which following recrystallization from a mixture of dimethylformamide and water, melts at 254–256° C.

Analysis calculated for $C_{15}H_{14}ClN_3O_2S_2$: C, 48.97; H, 3.84; N, 11.42. Found: C, 49.14; H, 3.82; N, 11.42.

Step C: Preparation of 3-(4-pyridyl)-6-chloro-7-isopropyl sulfonyl-1,2,4-benzothiadiazine-1,1-dioxide. Oxidation of the 3-(4-pyridyl)-6-chloro-7-isopropylthio-1,2,4-benzothiadiazine-1,1-dioxide by the process described in Step C of Example 1 provides the 7-isopropylsulfonyl derivative, M.P. 275–277° C.

Analysis calculated for $C_{15}H_{14}ClN_3O_4S_2$: C, 45.05; H, 3.53; N, 10.51. Found: C, 45.20; H, 3.59; N, 10.39.

EXAMPLE 11

3-(4-pyridyl)-6-chloro-7-methylsulfonyl-1,2,4-benzothiadiazine-1,1-dioxide

By replacing the isopropyl chloride employed in Example 1, Step B, by an equivalent quantity of methyl iodide and following substantially the same procedure described in Step B of Example 1, there is obtained 6-chloro-7-methylthio-1,2,4-benzothiadiazine-1,1-dioxide. This compound then is converted to the corresponding orthanilamide by the process of Example 10, Step A, the orthanilamide reacted with 4-pyridine carboxylic acid by the procedure described in Step B of Example 10, followed by oxidation according to the method described in Example 1, Step C, to provide 3-(4-pyridyl)-6-chloro-7-methylsulfonyl-1,2,4-benzothiadiazine-1,1-dioxide, M.P. 346–347° C.

Analysis calculated for $C_{13}H_{10}ClN_3O_4S_2$: C, 41.99; H, 2.71; N, 11.30. Found: C, 41.91; H, 2.73; N, 11.24.

The products identified in Table II are made by the process described in Example 10, Steps A–C, except that the benzothiadiazine in Step A and the 4-pyridine carboxylic acid employed in Step B are replaced by the reactants identified in the table. The X, R and $R^1$ groups in the reactants are retained unchanged in the end product, I:

TABLE II

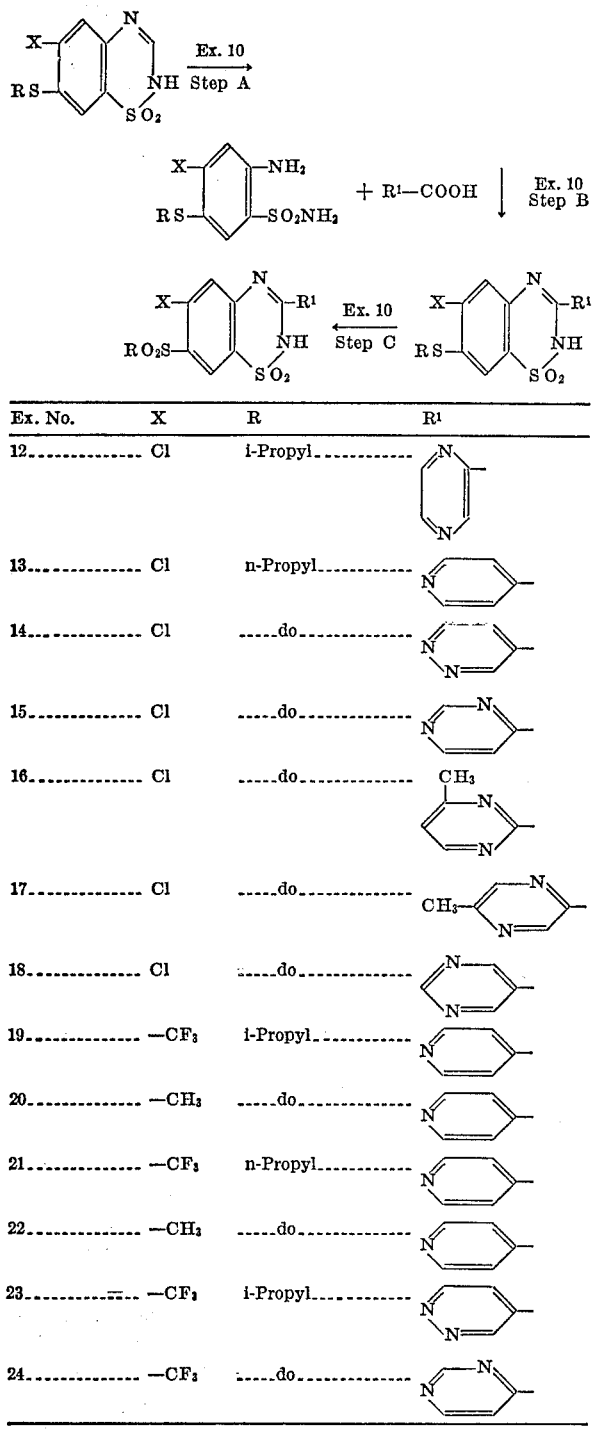

| Ex. No. | X | R | $R^1$ |
|---|---|---|---|
| 12 | Cl | i-Propyl | (pyrazine) |
| 13 | Cl | n-Propyl | (pyridine) |
| 14 | Cl | do | (pyrazine) |
| 15 | Cl | do | (pyrimidine) |
| 16 | Cl | do | CH₃-pyrimidine |
| 17 | Cl | do | CH₃-pyrazine |
| 18 | Cl | do | (pyrazine) |
| 19 | —CF₃ | i-Propyl | (pyridine) |
| 20 | —CH₃ | do | (pyridine) |
| 21 | —CF₃ | n-Propyl | (pyridine) |
| 22 | —CH₃ | do | (pyridine) |
| 23 | —CF₃ | i-Propyl | (pyrimidine) |
| 24 | —CF₃ | do | (pyridine) |

EXAMPLE 25

3-methyl-6-chloro-7-isopropylsulfoyl-1,2,4-benzothiadiazine-1,1-dioxide

A mixture of 2 - sulfamoyl-4-isopropylthio-5-chloro-aniline (0.02 mole), (prepared as described in Example 10, Step A) and acetyl chloride (0.022 mole) in dioxane (75 ml.) is heated under reflux for 24 hours. The solution is concentrated to dryness in vacuo and the residue dissolved in 75 ml. of ethanol and treated with 75 ml. of concentrated ammonium hydroxide in the cold. Thereafter the solution is heated under reflux for three hours and concentrated to dryness in vacuo providing 3-methyl-6-chloro-7-isopropylthio-1,2,4 - benzothiadiazine - 1,1 - dioxide. Oxidation of this compound by the process described in Step C of Example 1 gives 3-methyl-6-chloro-7-isopropylsulfonyl-1,2,4-benzothiadiazine-1,1-dioxide, M.P. 282–283° C.

Analysis calculated for $C_{11}H_{13}ClN_2O_4S_2$: C, 39.22; H, 3.89; N, 8.32. Found: C, 39.53; H, 4.12; N, 8.33.

EXAMPLE 26

3-ethoxycarbonyl-6-chloro-7-isopropylsulfonyl-1,2,4-benzothiadiazine-1,1-dioxide This product, prepared by replacing the acetyl chloride and the ammonium hydroxide employed in Example 25 by equivalent quantities of ethyl oxalyl chloride and trimethylamine, respectively, and otherwise following substantially the same procedure described in Example 25, melts at 259–261° C.

Analysis calculated for $C_{13}H_{15}ClN_2O_6S_2$: C, 39.54; H, 3.83; N, 7.10. Found: C, 39.71; H, 3.78; N, 7.34.

EXAMPLE 27

3-methoxycarbonyl-6-chloro-7-isopropylsulfonyl-1,2,4-benzothiadiazine-1,1-dioxide This product, also prepared by the process described in Example 25 except methyl oxalyl chloride and methanol are employed in place of acetyl chloride and dioxane, and trimethylamine is used instead of ammonium hydroxide, melts at 262–264° C.

Analysis calculated for $C_{12}H_{13}ClN_2O_6S_2$: C, 37.84; H, 3.43; N, 7.36. Found: C, 38.07; H, 3.65; N, 7.43.

The products identified in Table III are prepared following substantially the same procedure described in Example 25 but replacing the orthanilamide derivative, the acid chloride, and ammonium hydroxide by the reactants and reagents identified in the following table:

TABLE III

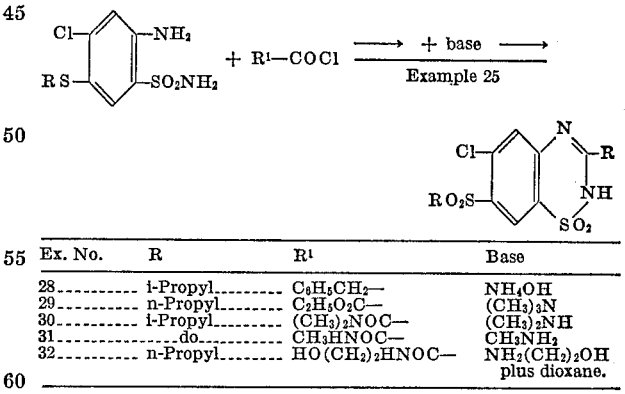

| Ex. No. | R | $R^1$ | Base |
|---|---|---|---|
| 28 | i-Propyl | C₆H₅CH₂— | NH₄OH |
| 29 | n-Propyl | C₂H₅O₂C— | (CH₃)₃N |
| 30 | i-Propyl | (CH₃)₂NOC— | (CH₃)₂NH |
| 31 | do | CH₃HNOC— | CH₃NH₂ |
| 32 | n-Propyl | HO(CH₂)₂HNOC— | NH₂(CH₂)₂OH plus dioxane. |

EXAMPLE 33

3-carbamoyl-6-chloro-7-n-propylsulfonyl-1,2,4-benzothiadiazine-1,1-dioxide

A mixture of 2 - sulfamoyl-4-n-propylthio-5-chloroaniline (0.02 mole), [made by the procedure described in Example 1, Step B, using n-propyl chloride instead of isopropyl chloride followed by treatment with sodium hydroxide by the method described in Example 10, Step A] and ethyl oxalyl chloride (0.022 mole) in dioxane (40 ml.) is heated under reflux for 18 hours and then concentrated to dryness in vacuo. The residue is dissolved in a mixture of ethanol (30 ml.) and concentrated ammonium hydroxide (30 ml.) and stirred at room temperature for 2–3 days. The solution is concentrated to dryness in vacuo and the residue stirred in sodium bicarbonate solution and filtered. The filtrate is acidified and the product recrystallized from dimethylformamide-water providing 3-carbamoyl - 6-chloro-7-n-propylthio-1,2,4-benzothiadiazine-1,1-dioxide. Oxidation of this compound by the process described in Example 1, Step C, gives 3-carbamoyl-6-chloro-7 - n-propylsulfonyl - 1,2,4-benzothiadiazine-1,1-dioxide, M.P. 299–301° C.

Analysis calculated for $C_{11}H_{12}ClN_3O_5S_2$: C, 36.11; H, 3.31; N, 11.49. Found: C, 36.29; H, 3.52; N, 11.4.

EXAMPLE 34

3-carbamoyl-6-chloro-7-isopropylsulfonyl-1,2,4-benzothiadiazine-1,1-dioxide

By replacing the orthanilamide employed in Example 33 by an equivalent quantity of 2-sulfamoyl-4-isopropylthio-5-chloroaniline and following substantially the same procedure described in Example 33, there is obtained 3-carbamoyl - 6-chloro-7-isopropylsulfonyl-1,2,4-benzothiadiazine-1,1-dioxide, M.P. 228–230° C.

Analysis calculated for $C_{11}H_{12}ClN_3O_5S_2$: C, 36.11; H, 3.31; N, 11.49. Found: C, 36.04; H, 3.43; N, 11.27.

EXAMPLE 35

3-carbamoyl-6-chloro-7-(1-ethylpropylsulfonyl)-1,2,4-benzothiadiazine-1,1-dioxide By replacing the orthanilamide employed in Example 33 by an equimolecular quantity of 2-sulfamoyl-4-(1-ethylpropylthio)-5-chloroaniline [made by the procedure described in Example 1, Step B, using 1-ethylpropyl chloride instead of isopropyl chloride followed by treatment with sodium hydroxide by the method described in Example 10, Step A] and following substantially the same procedure described in Example 33 there is obtained 3-carbamoyl - 6-chloro-7-(1-ethylpropylsulfonyl)-1,2,4-benzothiadiazine-1,1-dioxide, M.P. 314–316° C.

Analysis calculated for $C_{13}H_{16}ClN_3O_5S_2$: C, 39.64; H, 4.09; N, 10.67. Found: C, 39.83; H, 4.00; N, 10.69.

EXAMPLE 36

3-chloromethyl-6-chloro-7-isopropylsulfonyl-1,2,4-benzothiadiazine-1,1-dioxide

Step A: Preparation of 3-chloromethyl-6-chloro-7-isopropylthio-1,2,4-benzothiadiazine-1,1-dioxide. A mixture of 2 - sulfamoyl - 4-isopropylthio-5-chloroaniline (0.02 mole) and chloroacetyl chloride (0.022 mole) in dioxane (75 ml.) is heated under reflux for 24 hours. The solution then is concentrated to dryness in vacuo, the residue dissolved in ethanol (60 ml.) and heated under reflux with potassium acetate (0.022 mole) and water (10 ml.) for two hours. The alcohol is removed in vacuo and the solution then acidified with hydrocholric acid. The precipitated product is recrystallized from a mixture of methanol and water to provide 3-chloromethyl-6-chloro-7-isopropylthio-1,2,4-benzothiadiazine-1,1-dioxide, M.P. 248–250° C.

Analysis calculated for $C_{11}H_{12}Cl_2N_2O_2S_2$: C, 38.94; H, 3.57; N, 8.26. Found: C, 39.16; H, 3.65; N, 8.28.

Step B: Preparation of 3-chloromethyl-6-chloro-7-isopropylsulfonyl - 1,2,4-benzothiadiazine-1,1-dioxide. Oxidation of the 7-isopropylthio compound of Step A by the process described in Example 1, Step C, gives 3-chloromethyl - 6 -chloro - 7-isopropylsulfonyl-1,2,4-benzothiadiazine-1,1-dioxide, M.P. 284–287° C.

Analysis calculated for $C_{11}H_{12}Cl_2N_2O_4S_2$: C, 35.58; H, 3.26; N, 7.55. Found: C, 35.95; H, 3.20; N, 7.59.

EXAMPLE 37

3-chloromethyl-6-chloro-7-n-propylsulfonyl-1,2,4-benzothiadiazine-1,1-dioxide

This product, prepared following substantially the same procedure described in Example 36 with the exception that an equivalent quantity of 2-sulfamoyl-4-n-propylthio-5-chloroaniline is employed in place of the aniline reactant used in Example 36, melts at 268–269° C.

Analysis calculated for $C_{11}H_{12}Cl_2N_2O_4S_2$: C, 35.58; H, 3.26; N, 7.55. Found: C, 35.34; H, 3.33; N, 7.69.

EXAMPLE 38

3-dichloromethyl-6-chloro-7-isopropylsulfonyl-1,2,4-benzothiadiazine-1,1-dioxide Step A: Preparation of 3-dichloromethyl-6-chloro-7-isopropylthio-1,2,4-benzothiadiazine - 1,1 - dioxide. By replacing the acid chloride employed in Example 36 by an equimolecular quantity of dichloroacetyl chloride and following substantially the same procedure described in Example 36, Step A, there is obtained 3-dichloromethyl-6-chloro-7 - isopropylthio - 1,2,4 - benzothiadiazine - 1,1-dioxide, M.P. 287–289° C.

Analysis calculated for $C_{11}H_{11}Cl_3N_2O_2S_2$: C, 35.35; H, 2.97; N, 7.50. Found: C, 35.41; H, 3.11; N, 7.54.

Step B: Preparation of 3-dichloromethyl-6 - chloro - 7-isopropylsulfonyl-1,2,4-benzothiadiazine - 1,1 - dioxide. Oxidation of the 7-isopropyl compound of Step A by the process described in Example 1, Step C, gives 3-dichloromethyl-6-chloro-7 - isopropylsulfonyl - 1,2,4 - benzothiadiazine-1,1-dioxide, M.P. 287–290° C.

Analysis calculated for $C_{11}H_{11}Cl_3N_2O_4S_2$: C, 32.56; H, 2.73; N, 6.91. Found: C, 32.96; H, 2.99; N, 6.97.

EXAMPLE 39

3-dichloromethyl-6-chloro-7-n-propylsulfonyl-1,2,4-benzothiadiazine-1,1-dioxide

By replacing the orthanilamide and chloroacetyl chloride employed in Step A of Example 36 by equivalent quantities of 2-sulfamoyl-4-n-propylthio-5 - chloroaniline and dichloroacetyl chloride, respectively, and then following substantially the same procedure described in Step A of Example 36, there is obtained 3-dichloromethyl-6-chloro-7-n-propylthio - 1,2,4 - benzothiadiazine - 1,1-dioxide. Oxidation of this compound by the process of Example 1, Step C, gives 3-dichloromethyl-6-chloro-7-n-propylsulfonyl-1,2,4-benzothiadiazine-1,1 - dioxide, M.P. 281–283° C.

Analysis calculated for $C_{11}H_{11}Cl_3N_2O_4S_2$: C, 32.56; H, 2.73; N, 6.91. Found: C, 32.63; H, 2.87; N, 6.90.

EXAMPLE 40

3-trichloromethyl-6-chloro-7-isopropylsulfonyl-1,2,4-benzothiadiazine-1,1-dioxide By replacing the acid chloride employed in Example 36 by an equivalent quantity of trichloroacetyl chloride and following substantially the same procedure described in Step A of Example 36 followed by the oxidation procedure described in Step C of Example 1, there is obtained 3-trichloromethyl-6-chloro - 7 - isopropylsulfonyl-1,2,4-benzothiadiazine-1,1-dioxide, M.P. 298–300° C.

Analysis calculated for $C_{11}H_{10}Cl_4N_2O_4S_2$: C, 30.01; H, 2.29; N, 6.36. Found: C, 30.25; H, 2.40; N, 6.46.

EXAMPLE 41

3-trichloromethyl-6-chloro-7-n-propylsulfonyl-1,2,4-benzothiadiazine-1,1-dioxide By replacing the orthanilamide and the acid chloride employed in Example 36, Step A, by equivalent quantities of 2-sulfamoyl-4-n-propylthio - 5 - chloroaniline and trichloroacetyl chloride, respectively, and then following substantially the same procedure described in Example 36, Step A, followed by the oxidation procedure described in Example 1, Step C, there is obtained 3-trichloromethyl-6-chloro-7-n-propylsulfonyl - 1,2,4 - benzothiadiazine-1,1-dioxide, M.P. 304–305° C.

Analysis calculated for $C_{11}H_{10}Cl_4N_2O_4S_2$: C, 30.01; H, 2.29; N, 6.36. Found: C, 30.32; H, 2.41; N, 6.71.

EXAMPLE 42

3-carboxy-6-chloro-7-isopropylsulfonyl-1,2,4-benzothiadiazine-1,1-dioxide·$H_2O$ A mixture of 2-sulfamoyl - 4 - isopropylthio-5-chloro-aniline (0.02 mole) and ethyl oxalyl chloride (0.022 mole) in dioxane (40 ml.) is heated under reflux for 18 hours and then concentrated to dryness in vacuo. The residue is dissolved in 25% trimethylamine (40 ml.) and stirred at ambient temperature for about 3 days. The solution is concentrated to dryness in vacuo and the residue dissolved in sodium bicarbonate solution, filtered and the filtrate acidified to precipitate 3-carboxy-6-chloro-7-isopropylthio-1,2,4-benzothiadiazine - 1,1 - dioxide. Treatment of this compound with potassium permanganate by the process described in Example 1, Step C, gives 3-carboxy-6-chloro - 7 - isopropylsulfonyl - 1,2,4 - benzothiadiazine-1,1-dioxide·$H_2O$, M.P. 281–283° C.

Analysis calculated for $C_{11}H_{13}ClN_2O_7S_2$: C, 34.33; H, 3.40; N, 7.28. Found: C, 34.62; H, 3.45; N, 7.27.

Representative 7 - alkylsulfonylbenzothiadiazines were found to be effective when tested by an art recognized procedure designed to evaluate xanthine oxidase inhibiting properties of compounds. The procedure used employed the principals described in J. Pharm. Soc. 56: 955 (1967), Baker et al., and was carried out in the following manner:

A reference cuvette is filled with 0.05M pH 7.4 buffer. For the control, mix quickly in a cuvette 2 ml. hypoxanthine solution ($6 \times 10^{-5}$M), 2 ml. 0.05M pH 7.4 buffer solution, and 2 ml. xanthine oxidase solution, and immediately record the absorbance at 292μ for one minute. For the test solution, add quickly to a separate cuvette 2 ml. hypoxanthine solution ($6 \times 10^{-5}$M), 2 ml. test solution, and 2 ml. xanthine oxidase solution, and immediately record the absorbance at 292μ for one minute. If the inhibition is less than 100%, the % inhibition is calculated as follows:

$$\frac{\Delta A \text{ control} - \Delta A \text{ test}}{\Delta A \text{ control}} \times 100$$

where ΔA is the change in absorbance in one minute. If the inhibition is 100%, the test solution is serially diluted to determine the concentration required for 50% inhibition.

The percent inhibition effected by certain representative products employed in the method of this invention is provided in the following table. The concentration of the test compound was $2 \times 10^{-5}$M unless otherwise noted. For comparison $3.2 \times 10^{-6}$M of allopurinol, a known xanthine oxidase inhibiting agent, effects 50% inhibition of xanthine oxidase by this protocol.

TABLE IV

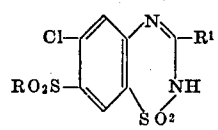

| R | $R^1$ | Percent Inhibition |
|---|---|---|
| $iC_3H_7$ | H | 49 |
| $C_6H_5CH_2$ | H | 38 |
| $nC_3H_7$ | H | 26 |
| $(C_2H_5)_2CH$ | H | 22 |
| $iC_3H_7$ | ![pyridyl] | [1] 51 |
| $CH_3$ | ![pyridyl] | [2] 62 |
| $iC_3H_7$ | $CH_3$ | 78 |
| $iC_3H_7$ | $-CO_2C_2H_5$ | [3] 40 |
| $iC_3H_7$ | $-CO_2CH_3$ | 49 |
| $nC_3H_7$ | $-CONH_2$ | [3] 59 |
| $iC_3H_7$ | $-CONH_2$ | [3] 84 |
| $(C_2H_5)_2CH$ | $-CONH_2$ | 64 |
| $iC_3H_7$ | $-CH_2Cl$ | [3] 62 |
| $nC_3H_7$ | $-CH_2Cl$ | 77 |
| $iC_3H_7$ | $-CHCl_2$ | 43 |
| $nC_3H_7$ | $-CHCl_2$ | 5 |
| $iC_3H_7$ | $-CCl_3$ | 49 |
| $nC_3H_7$ | $-CCl_3$ | 12 |
| $iC_3H_7$ | $-CO_2H$ | 24 |

NOTE.—Concentration of test compound:
[1] $2 \times 10^{-5}$. [2] $2 \times 10^{-7}$. [3] $2 \times 10^{-6}$.

I claim:

1. A method which comprises orally administering to a mammal having an elevated blood uric acid level a dose sufficient to lower the blood uric acid level to normal for that species a 3-$R^1$-6-X-7-$RO_2$S-1,2,4-benzothiadiazine-1,1-dioxide or the sodium or potassium salt thereof wherein X represents $C_{1-3}$alkyl, chloro and trifluoromethyl; $R^1$ represents pyridyl and lower alkyl substituted pyridyl; and R represents lower alkyl and phenyl lower alkyl.

2. A method as claimed in claim 1 wherein in the active agent X is trifluoromethyl.

3. A method as claimed in claim 1 wherein in the active agent X is chloro.

4. A method which comprises orally administering to a mammal having an elevated blood uric acid level a dose sufficient to lower the blood uric acid level to normal for that species of a xanthine oxidase inhibiting compound of the formula 3-$R^1$-6-X-7-$RO_2$S-1,2,4-benzothiadiazine-1,1-dioxide or a sodium or potassium salt thereof wherein X represents chloro; $R^1$ represents pyridyl; and R represents lower alkyl.

5. A method as claimed in claim 4 wherein in the active agent $R^1$ is 4-pyridyl.

6. A method as claimed in claim 1 wherein in the active agent X is chloro, R is isopropyl and $R^1$ is 4-pyridyl.

7. A method as claimed in claim 4 wherein in the active agent, R is methyl and $R^1$ is 4-pyridyl.

References Cited

J. Org. Chem. 25: 970 (1960), Novello et al.
Chem. Plus Pharm. Bull. 10, No. 11: 1001 (1962), Kugita et al.

STANLEY J. FRIEDMAN, Primary Examiner